United States Patent
Raman et al.

(10) Patent No.: US 10,903,999 B1
(45) Date of Patent: Jan. 26, 2021

(54) PROTECTING PII DATA FROM MAN-IN-THE-MIDDLE ATTACKS IN A NETWORK

(71) Applicant: Zscaler, Inc., San Jose, CA (US)

(72) Inventors: Vivek Ashwin Raman, San Jose, CA (US); Ajit Singh, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 34 days.

(21) Appl. No.: 16/567,447

(22) Filed: Sep. 11, 2019

(51) Int. Cl.
| | |
|---|---|
| *H04L 29/06* | (2006.01) |
| *H04L 29/08* | (2006.01) |
| *H04L 9/08* | (2006.01) |
| *H04L 9/14* | (2006.01) |
| *H04L 9/32* | (2006.01) |
| *H04L 9/06* | (2006.01) |

(52) U.S. Cl.
CPC .............. *H04L 9/14* (2013.01); *H04L 9/0631* (2013.01); *H04L 9/083* (2013.01); *H04L 9/0825* (2013.01); *H04L 9/0891* (2013.01); *H04L 9/3242* (2013.01)

(58) Field of Classification Search
CPC ....... H04L 9/14; H04L 9/0825; H04L 9/0631; H04L 9/083; H04L 9/0891; H04L 9/3242
See application file for complete search history.

(56) References Cited

U.S. PATENT DOCUMENTS

| | | | |
|---|---|---|---|
| 7,200,868 B2* | 4/2007 | Mattox .................. | H04N 7/163 348/E7.056 |
| 7,548,620 B2* | 6/2009 | Popp ...................... | H04L 9/3263 380/273 |
| 8,656,154 B1 | 2/2014 | Kailash et al. | |
| 8,806,201 B2 | 8/2014 | Kailash et al. | |
| 8,869,259 B1 | 10/2014 | Udupa et al. | |
| 9,426,135 B2* | 8/2016 | Sharma .................. | H04L 51/00 |
| 9,436,809 B2* | 9/2016 | Kamperman ....... | H04L 63/0823 |
| 9,654,507 B2 | 5/2017 | Gangadharappa et al. | |
| 9,935,955 B2 | 4/2018 | Desai et al. | |
| 10,225,237 B2 | 3/2019 | Singh | |
| 2015/0082040 A1* | 3/2015 | Anzai .................... | H04L 9/0822 713/171 |
| 2019/0028269 A1* | 1/2019 | Lu .......................... | H04L 9/0822 |

* cited by examiner

*Primary Examiner* — Mohammad A Siddiqi
(74) *Attorney, Agent, or Firm* — Clements Bernard Walker; Lawrence A. Baratta, Jr.

(57) ABSTRACT

Systems and methods include receiving a request from a client with the request including an authentication token as a request header, wherein the authentication token includes a first encryption key, a second encryption key, and a timestamp; decrypting the authentication token with a private key of the server to obtain the first encryption key, the second encryption key, and the timestamp; and validating the request based on the first encryption key and the timestamp, and, if valid, decrypting payload of the request with the second encryption key.

15 Claims, 5 Drawing Sheets

PROTECTING PII DATA FROM MAN-IN-THE-MIDDLE ATTACKS IN A NETWORK

FIELD OF THE DISCLOSURE

The present disclosure relates generally to network security. More particularly, the present disclosure relates to systems and methods for protecting Personally Identifiable Information (PII) data over a network from man-in-the-middle attacks for mobile devices.

BACKGROUND OF THE DISCLOSURE

Personally Identifiable Information (PII) data includes any information related to identifying a person. The concept of PII has become prevalent as information technology and the Internet has made it easier to collect PII leading to a profitable market in collecting and reselling PII. PII can also be exploited by criminals to stalk or steal the identity of a person, or to aid in the planning of criminal acts. Specifically, user devices such as mobile phones contain a significant amount of PII which can be compromised over a network through man in the middle and replay attacks, via Hypertext Transfer Protocol (HTTP) and HTTP Secure (HTTPS) communications between a client and server.

A man-in-the-middle attack is carried out by hackers to insert their presence in between the communication of two parties to gain access to all the information sent to and from both the parties. The hacker can stop the users from sending and receiving data, or might even divert and redirect the messages to another user. The main objective of man-in-the-middle attacks is to eavesdrop the users' conversation, masking their presence, making it appear so normal as if there is no third person involved in the communication. A replay attack (also known as playback attack) is a form of network attack in which valid data transmission is maliciously or fraudulently repeated or delayed. This is carried out either by the originator or by an adversary who intercepts the data and re-transmits it, possibly as part of a masquerade attack by Internet Protocol (IP) packet substitution. This is one of the lower-tier versions of a man-in-the-middle attack.

There are various existing approaches to secure against such attacks, including Secure Sockets Layer (SSL) scanning with HTTPS, certificate pinning, and session management where reauthentication is required at periodic intervals. However, these approaches are processing and networking intensive and do not scale well when looking at millions of transactions.

BRIEF SUMMARY OF THE DISCLOSURE

In an embodiment, a non-transitory computer-readable storage medium having computer-readable code stored thereon is configured to program a server to perform steps of receiving a request from a client with the request including an authentication token as a request header, wherein the authentication token includes a first encryption key, a second encryption key, and a timestamp; decrypting the authentication token with a private key of the server to obtain the first encryption key, the second encryption key, and the timestamp; and validating the request based on the first encryption key and the timestamp, and, if valid, decrypting payload of the request with the second encryption key. The computer-readable code can be further configured to program the server to perform steps of sending a failure code if the request is invalid. The request can be invalid if a current time is not within a predetermined time of the timestamp. The computer-readable code can be further configured to program the server to perform steps of checking a payload hash to the payload to determine if there has been a modification of the payload, and, if so, sending a failure code that the request is invalid. The request header can include the first encryption key, the second encryption key, and the timestamp, each separated by an identifier. The authentication token can be encrypted with Public Key Infrastructure (PKI) with the client having a public key of the server. The second encryption key can be an Advanced Encryption Standard (AES) key. The first encryption key can be an application key.

In another embodiment, a server includes a network interface communicatively coupled to a network; a processor communicatively coupled to the network interface; and memory storing computer-executable instructions that, when executed, cause the processor to receive a request from a client with the request including an authentication token as a request header, wherein the authentication token includes a first encryption key, a second encryption key, and a timestamp; decrypt the authentication token with a private key of the server to obtain the first encryption key, the second encryption key, and the timestamp; and validate the request based on the first encryption key and the timestamp, and, if valid, decrypt payload of the request with the second encryption key. The computer-executable instructions that, when executed, can further cause the processor to send a failure code if the request is invalid. The request can be invalid if a current time is not within a predetermined time of the timestamp. The computer-executable instructions that, when executed, can further cause the processor to check a payload hash to the payload to determine if there has been a modification of the payload, and, if so, sending a failure code that the request is invalid. The request header can include the first encryption key, the second encryption key, and the timestamp, each separated by an identifier. The authentication token can be encrypted with Public Key Infrastructure (PKI) with the client having a public key of the server. The second encryption key can be an Advanced Encryption Standard (AES) key. The first encryption key can be an application key.

In a further embodiment, a method implemented by a server includes receiving a request from a client with the request including an authentication token as a request header, wherein the authentication token includes a first encryption key, a second encryption key, and a timestamp; decrypting the authentication token with a private key of the server to obtain the first encryption key, the second encryption key, and the timestamp; and validating the request based on the first encryption key and the timestamp, and, if valid, decrypting payload of the request with the second encryption key. The method can further include sending a failure code if the request is invalid. The method can further include checking a payload hash to the payload to determine if there has been a modification of the payload, and, if so, sending a failure code that the request is invalid. The authentication token can be encrypted with Public Key Infrastructure (PKI) with the client having a public key of the server.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

DETAILED DESCRIPTION OF THE DISCLOSURE

The present disclosure relates to systems and methods for protecting Personally Identifiable Information (PII) data over a network from man-in-the-middle (MITM) attacks for mobile devices. The present disclosure uses a combination of encryption algorithms to protect the data and prevent replay attacks using key randomization and time-sensitive values in the payload thereby allowing only the cloud nodes to understand valid payloads and discard invalid ones. This approach does not use any session-based authentication mechanisms thereby allowing any cloud node anywhere in the world to understand and operate on a payload from a client without data synchronization across nodes. The present disclosure provides comprehensive, efficient security between a client device and a cloud node (server) communication thereby preventing it from common MITM and replay attacks and securing the critical PII information over network without maintaining stateful sessions and binding to a single cloud node instance. The solution is also horizontally scalable across regions or clouds.

Example Cloud System Architecture

Figure 1:
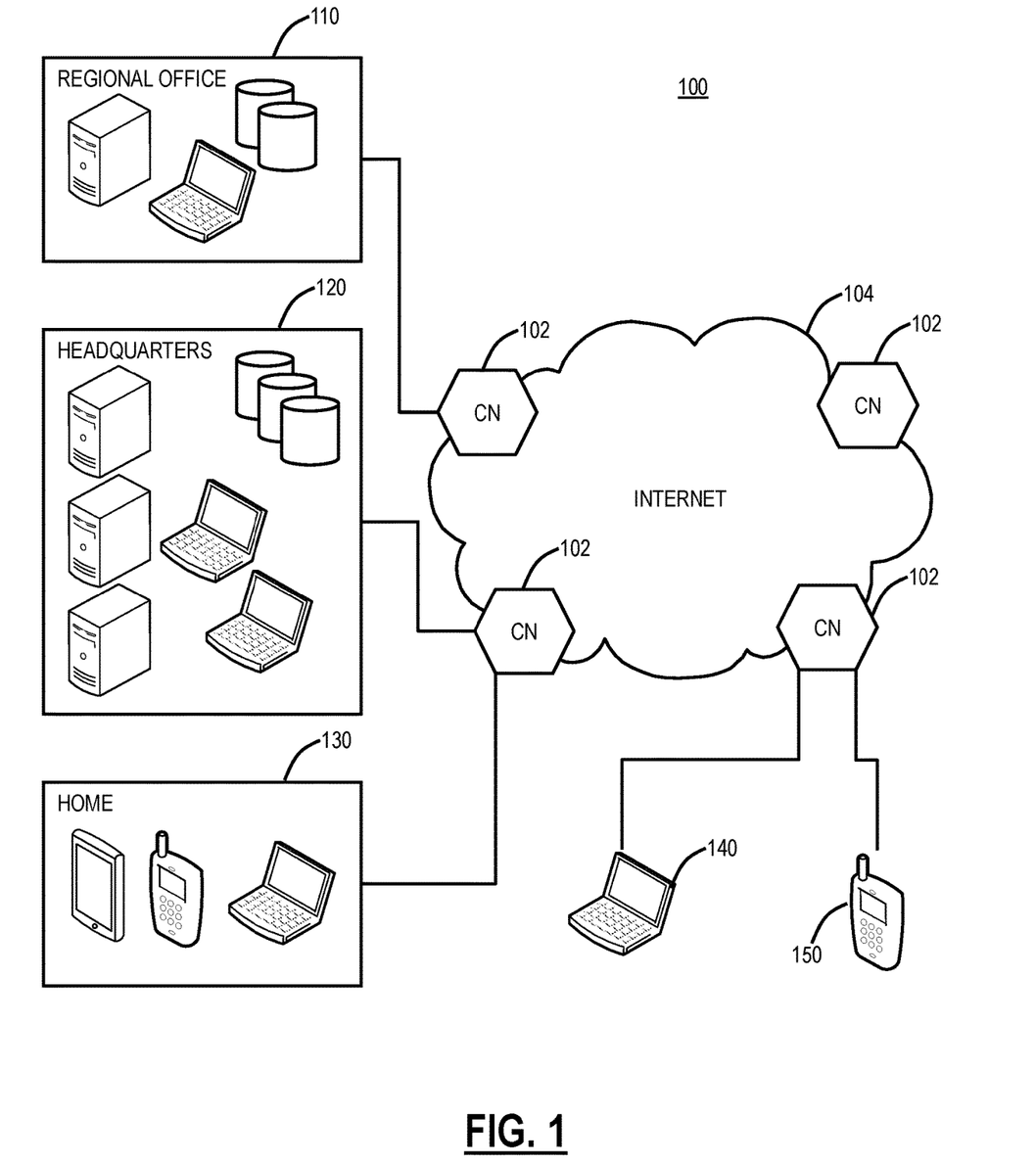
FIG. 1 is a network diagram of a cloud-based system for implementing various cloud-based service functions.
Figure 2:
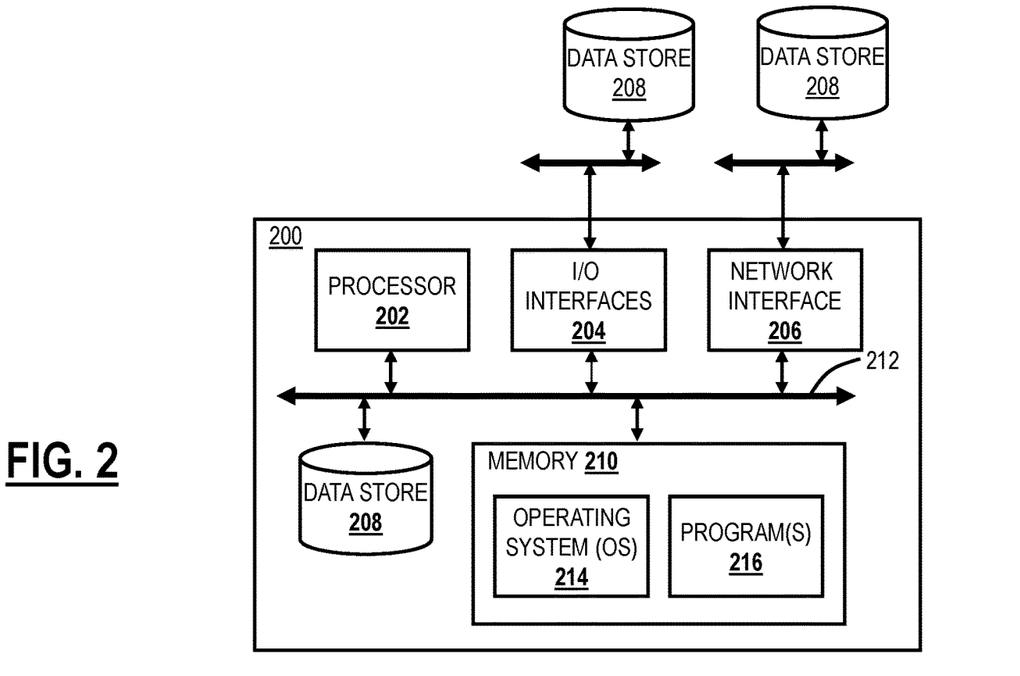

FIG. 1 is a network diagram of a cloud-based system 100 for implementing various cloud-based service functions. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, microservice segmentation, etc. For example, the IA service can provide a user with Internet Access, and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA.

Figure 3:
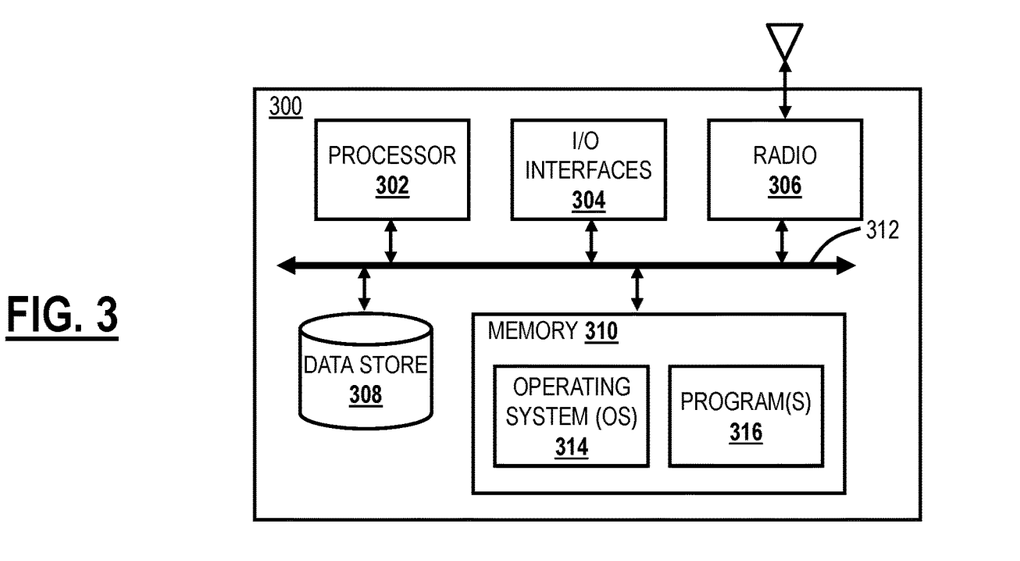

In an embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices, including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users which is dynamically available at the cloud nodes 102, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Mobile Device Architecture

FIG. 3 is a block diagram of a user device 300, which may be used in the cloud-based system 100 or the like. Again, the user device 300 can be a smartphone, a tablet, a smartwatch, an Internet of Things (IoT) device, a laptop, etc. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Enterprise Application

Figure 4:
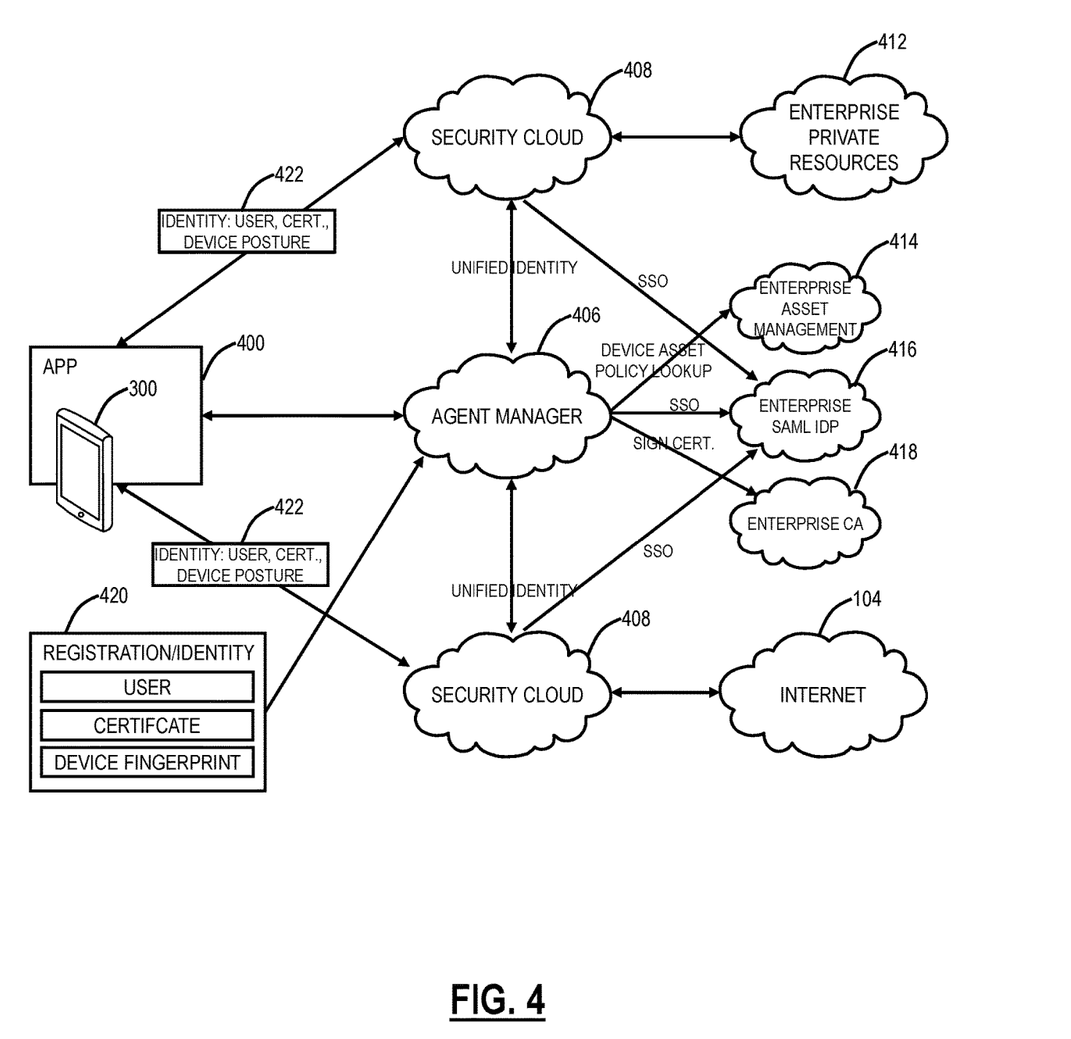
FIG. 4 is a network diagram of the functionality of an example enterprise application and associated connectivity.

FIG. 4 is a network diagram of the functionality of an example enterprise application 400 and associated connectivity. The enterprise application 400 is executed on a user device 300. The enterprise application 400 can dynamically learn all available services, adapts to changing network environments and provides a seamless and secure network resource access to Internet and darknet hosted applications. This is achieved through dynamic evaluation of network conditions, enrollment to individual services, learning individual service protocols, creating a link-local network on the device 300, and establishing multiple secure tunnels to cloud services over this local network.

The enterprise application 400 is communicatively coupled to an agent manager cloud 406, and a security cloud 408. Note, the security cloud 408 can be implemented in the cloud-based system 100, etc. The enterprise application 400 enables communication to enterprise private resources 412 via the security cloud 408 and to the Internet 104 via the security cloud 408. The agent manager cloud 406 can communicate with enterprise asset management 414, an enterprise Security Assertion Markup Language (SAML) Identity Provider (IDP) 416, and an enterprise Certificate Authority (CA) 418. The device 300 and the enterprise application 400 can perform a registration/identity 320 process through the agent manager cloud 306 where the user identity, the user's certificates, and a device fingerprint can uniquely identify the device 300. Once registered, the enterprise application 400 has an identity 322, which can include the user, certificates, device posture, etc. and which is shared with the security cloud 308.

The enterprise application 400 operates on a client-server model where an Information Technology (IT) admin enables appropriate services for end-users at a Cloud Administration Server (CAS) which can be part of an agent manager cloud 406, namely the enterprise asset management 414. Every client can make a unicast request to the agent manager cloud 406 (e.g., CAS) to discover all enabled services. On acknowledging the response, the client issues a request to authenticate to each service's cloud Identity Providers, the enterprise SAML IDP 416. Authentication can be multi-factor depending upon the nature of the service. On successful authentication, server contacts Mobile Device Management (MDM) or Inventory management provider to define access control rights for the device 300. Post authorization, the device 300 is successfully enrolled into the agent manager cloud 406, which tracks and monitors all behavior of the device 300.

Post-enrollment, the device 300 creates a link-local network with a specific Internet Protocol (IP) configuration, opens a virtual network interface to read and write packets and opens multiple listening sockets at custom ports to create secure tunnels to available services through the security cloud 408. On network changes, the device 300 dynamically evaluates reachability to pre-configured domains and depending upon the result, it appropriately transitions all network tunnels, thus providing a seamless experience to the end-user. Further, the device 300 also intelligently learns the conditions which are appropriate for setting up network tunnels to cloud services depending upon several network heuristics such as reachability to a particular cloud service.

Enterprise Application—Functionality

The enterprise application 400 enables a user to connect to multiple cloud services through the dynamic discovery of available services followed by authentication and access as exposed in the corresponding service protocol. The enterprise application 400 addressed the unmanageable growth of mobility and cloud-based services, which have led to a proliferation of individual applications for access to individual services. The enterprise application 400 can be implemented through a mobile application ("app") which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end-user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end-user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

Generally, the enterprise application 400 can support two broad functional categories—1) dynamic service discovery and access controls and 2) service availability. The dynamic service discovery and access controls include service configuration by the administrator, service discovery by the device 300, service acknowledgment and authentication, service authorization and enrollment, and the like. For service configuration by the administrator, the IT admin can provide cloud service details at a centralized knowledge server, such as part of the agent manager cloud 406, the enterprise asset management 414, etc. The cloud service details include the service type (e.g., Internet/intranet), network protocol, identity provider, server address, port, and access controls, etc.

For service discovery by the device 300, the device 300 can issue a network request to a known Cloud Administrative Server (CAS) in the agent manager cloud 406 to discover all enabled services for a user. If a specific cloud server is not known a priori, the device 404 can broadcast the request to multiple clouds, e.g., through the agent manager cloud 406 communicating to the enterprise asset management 414, the enterprise SAML IDP 416, and the enterprise CA 418.

For the service acknowledgment and authentication, the device 300 acknowledges the response of service discovery and initiates the authentication flow. The device 300 learns the authentication protocol through the service discovery configuration and performs authentication of a configured nature at the enterprise SAML IDP 416. For the service authorization and enrollment, post successful authentication, the CAS, authorizes the device 300 and fetches the access control information by contacting an MDM/Inventory Solutions Provider. Depending upon the user context and the nature of access, the CAS enrolls the device 300 into several cloud services and informs the cloud services that the user has been enrolled for access.

The service availability includes link-local network setup, a traffic interceptor, and dynamic traffic forwarding tunnels to authorized services. The link-local network setup, post-enrollment, has the device 300 create a local network on the device 300 itself to manage various networking functionalities. For the traffic interceptor, the device 300 intercepts and evaluates all Internet traffic. Allowed traffic is tunneled to the cloud services such as in the security cloud 408, whereas the rest of the traffic is denied as per enterprise policies. For the dynamic traffic forwarding tunnels to authorized services, depending upon the evaluation, the device 300 splits the traffic into the different tunnel to individual cloud services such as in the security cloud 408.

The enterprise application 400 is a single application that provides secure connectivity to the Internet 104 and darknet hosted applications, such as the private enterprise resources 412. The enterprise application 400 communicates securely to the agent manager 406, which is controlled by an IT admin. The enterprise application 400 learns available services and authenticates with each service. Post proper enrollment, the enterprise application 400 securely connects to cloud services by means of network tunnels.

Again, the enterprise application 400 is an example application, such as ZApp from Zscaler, Inc. Other types of enterprise applications are also contemplated herein. In general, the enterprise application 400 is executed on the user device 300, typically in the background. The enterprise application 400 enables some cloud-based functionality with the user device 300 and the cloud-based system 100. Further, issues with the enterprise application 400 are critical to resolve to ensure connectivity and access to the cloud-based system 100.

Solving MITM and Reply Attaches that Leak PII and Other Sensitive Information

The present disclosure relates to a secure communication technique between a user device 300 and another node, such as the cloud node 102, the server 200, etc. In an embodiment, the secure communication technique can be between the enterprise application 400 executed on the user device 300 and the cloud-based system 100, i.e., one of the cloud nodes 102. However, those skilled in the art will appreciate the secure communication technique described herein can be used in any context. One advantage of the secure communication technique with the cloud-based system 100 and between the user devices 300, such as executing the enterprise application 400, is the secure communication technique is comprehensive (with respect to preventing common MITM and replay attacks) and efficient (with respect to processing and scaling).

The present disclosure includes a combination of encryption approaches to both protect data and prevent replay attacks. The following table compiles the advantages and limitations of two encryptions strategies that would be used at certain parts of the request:

| Pre-Shared Key (PSK)/Advanced Encryption Standard (AES) | Public Key Infrastructure (PKI) |
| --- | --- |
| Both client and server encrypt/decrypt using shared key | The client encrypts data using the public key of the server; Server decrypts data using private key of the server. |
| the shared key stored inside code, vulnerable to leakage on disassembly | no data stored anywhere |
| Limited processing time and less volume of data to encrypt/decrypt | Processing time as well as the volume of data is huge |
| No scalability issues | Scalability issues exist. |

Thus, there are advantages and disadvantages to both approaches. As such, the present disclosure uses a combination of PKI and PSK.

Figure 5:
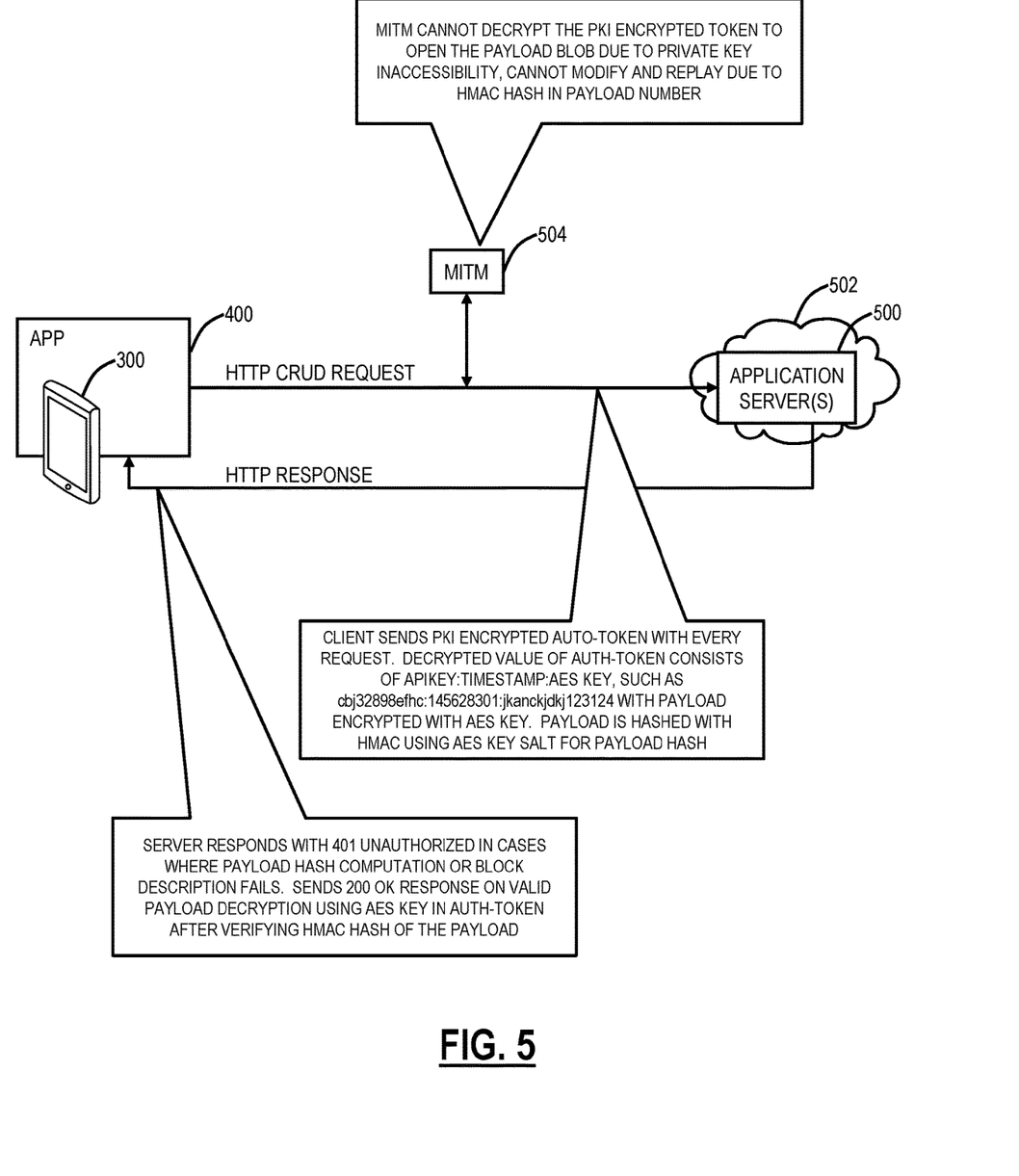
FIG. 5 is a network diagram illustrating an operation between a user device with the application and an application server in a cloud.

FIG. 5 is a network diagram illustrating an operation between a user device 300 with the application 400 and an application server 500 in a cloud 502. The functionality of the present disclosure can be implemented on mobile Representational State Transfer (REST) Application Programming Interfaces (APIs) and mobile clients to ensure secure and stateless interaction between the user device 300 and the application servers 500. For description purposes, the user device 300 can be referred to as a client and the application servers 500 as a server.

Each request coming from clients, such as using mobile APIs, sends an "auth-token" as a request header. The auth-token can include the Application interface key, a current timestamp with some amount of time added (e.g., a current UNIX timestamp with 10 minutes added, and an AES encryption key, collectively values in the auth-token. Each value in the auth-token can be appended and separated with an identifier, such as an ":" in between (e.g., cbj32898efhc:145628301:jkanckjdkj123124) and then put through encryption using PKI. The encrypted auth-token is sent as a request header (e.g., "auth-token": "encryptedToken").

The encryption here for the auth-token is done using the public key shared by the server. The request will be validated after decrypting at the server using its private key and then by checking both the API key and the current UNIX time if lesser than the one sent before accepting the request. The validated request is time-bound and hence subsequent replay with same request after validity time will fail with an unauthorized Hypertext Transfer Protocol (HTTP) status code (401) and status message (in JavaScript Object Notation (JSON) format). The auth-token header validation is done at the authentication filter level at the API, and hence all APIs defined with endpoints containing/mobile will need a valid auth-token before the request is consumed.

In FIG. 5, the user device 300 (client) sends a CRUD request. The primary or most-commonly-used HTTP verbs (or methods, as they are properly called) are POST, GET, PUT, PATCH, and DELETE. These correspond to create, read, update, and delete (or CRUD) operations, respectively. There are a number of other verbs, too, but are utilized less frequently. The client sends a PKI encrypted auto-token with every request. The decrypted value of the auth-token includes APIkey:timestamp:AES key, such as cbj32898efhc:145628301:jkanckjdkj123124 with the payload encrypted with the AES key. The payload can be hashed with Hash-based Message Authentication Code (HMAC) using the AES key salt for the payload hash.

The application server 500 responds with 401 unauthorized in cases where the payload hash computation or block description fails or sends a 200 OK response on valid payload decryption using the AES key in auth-token after verifying the HMAC hash of the payload. With a MITM 504, the MITM 504 cannot decrypt the PKI encrypted token to open the payload blob due to private key inaccessibility, and cannot modify and replay due to the HMAC hash in the payload number.

The timestamp has an added amount of time, such as 10 minutes such that all requests that have a skew of 10 minutes or above are rejected. The payload is also added with an additional header called "payload-hash" that contains an HMAC-SHA256 hashing of the entire payload thereby preventing payload modification for the same auth token. The client and server can have accurate time settings using the Network Time Protocol (NTP) or similar protocols.

Once the request passes through the authentication filter of the auth-token, the payload of the request is validated on critical parameters. Such critical parameters are request specific, and each request will have its own set of parameters (such as device ID, device hash, etc) which falls under the request payload validation. Some requests that would register with mobile administrator servers are critical since they update records or register with other services (ZPN, Proxy). Such critical requests will entirely be encrypted to prevent both data exposure and data modification. Other requests that report state and obtain information from the server will have part of it hashed to validate integrity done at the payload validation level.

The encryption for the payload can use AES as opposed to PKI used for the auth-token header. The key used for AES encryption is sent in the header as the auth-token, and the Initialization Vector (IV) is a combination of a dynamic and a static value. The static value will be pre-shared with the client and server. The dynamic part of the IV will be the timestamp sent as part of the auth-token header. Since the auth-token header will be encrypted using PKI, only the server and the client will know the AES key and request timestamp for that particular request. A sample secret key would look like—jkanckjdkj123124 and IV will look like 1437032945abcdef where the number (1437032945) part is the one that comes from the request in the header, and the alphabet part (abcdef) will be already shared among the client and server.

The security mechanism can be applied to mobile APIs, and since the clients will gradually be ported to use the APIs, the presence of the "auth-token" will communicate about the new security measures and validations. Once all clients are ported, the auth-token header will be made mandatory.

The Mobile APIs can currently use only HTTP POST, but since HTTP offers many methods such as GET, P,UT and DELETE that are lightweight in delivering the required data, the use of auth-token header can be a common security mechanism for all methods (be it with or without payload). Since all interaction happens over HTTPS, the payload, headers, URL params, etc. will all be protected and encrypted.

The API can use validations on the endpoints based on HTTP request method type and payload content type. The APIs can further use auth headers and specific payload encryption, with hashing. The approach has the APIs stateless, and each request is contained with all the information that the server will understand and process. There is no use of any session tokens which eventually destroy the RESTful concept and make API calls stateful. The server can subsequently send messages for each error code with localized message based on client language.

In a deployment scenario, current endpoints can be unchanged, and clients going through the authentication filter will be differentiated based on the presence of the auth-token. Any client sending the auth-token header will be using the new proposed contracts of sending device ID as part of header and payload hashed. The changes will be impacting only the contracts and validation; none of the business layers, data layer methods will be modified. Respective objects will be built after validation using the contracts to pass on the business layer.

Figure 6:
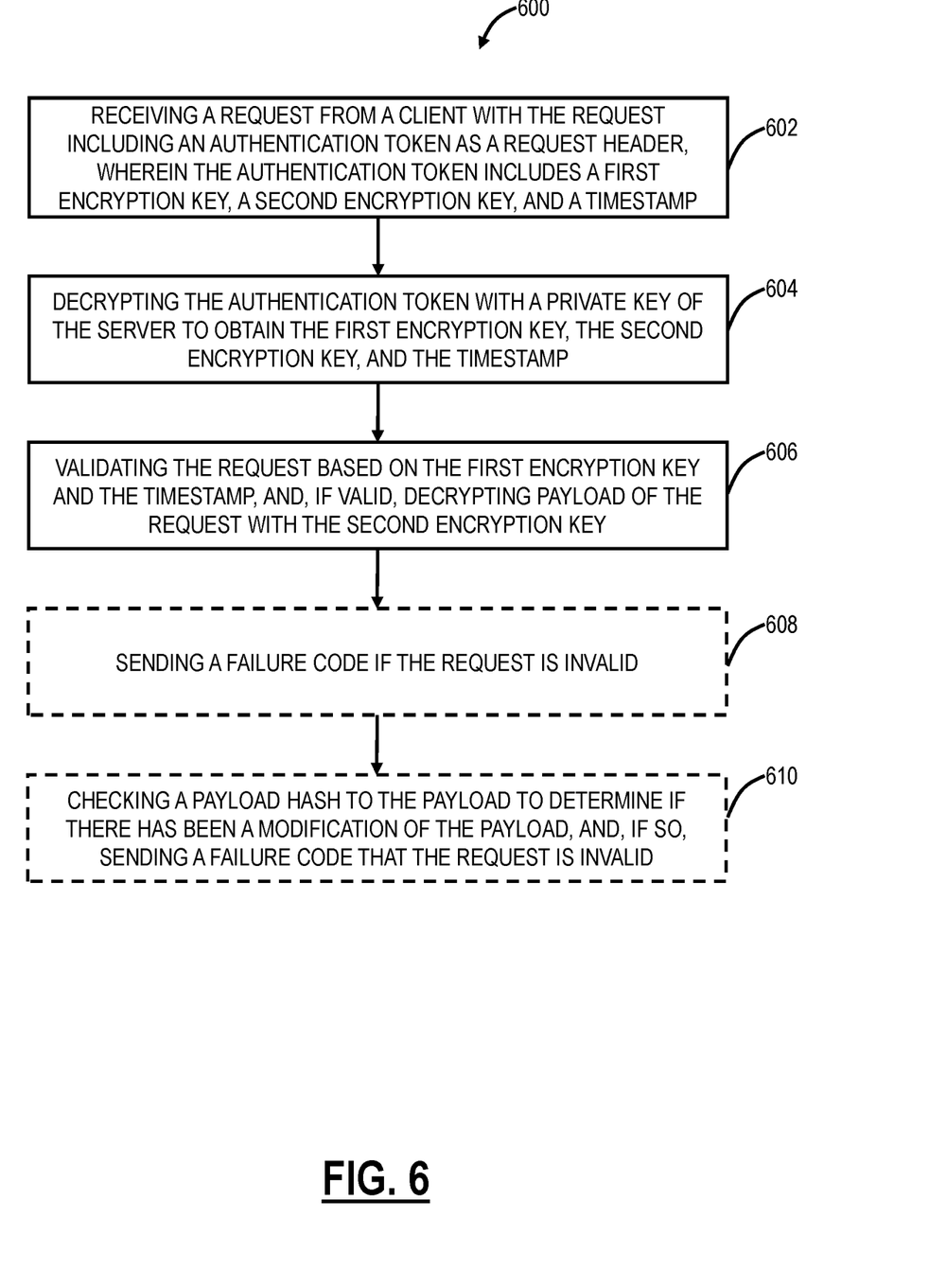
FIG. 6 is a flowchart of a process for a server utilizing two layers of encryption to protect PII data and prevent attacks.

FIG. 6 is a flowchart of a process 600 for a server utilizing two layers of encryption to protect PII data and prevent attacks. The process 600 can be implemented by a server 200, as a computer-implemented method, and/or embodied as computer-readable code stored on a non-transitory computer-readable storage. The process 600 includes receiving a request from a client with the request including an authentication token as a request header, wherein the authentication token includes a first encryption key, a second encryption key, and a timestamp (step 602); decrypting the authentication token with a private key of the server to obtain the first encryption key, the second encryption key, and the timestamp (step 604); and validating the request based on the first encryption key and the timestamp, and, if valid, decrypting payload of the request with the second encryption key (step 606).

The process 600 can also include sending a failure code if the request is invalid (step 608). The request can be invalid if a current time is not within a predetermined time of the timestamp. The process 600 can also include checking a payload hash to the payload to determine if there has been a modification of the payload, and, if so, sending a failure code that the request is invalid (step 610).

The request header can include the first encryption key, the second encryption key, and the timestamp, each separated by an identifier. The authentication token can be encrypted with Public Key Infrastructure (PKI) with the client having a public key of the server. The second encryption key can be an Advanced Encryption Standard (AES) key. The first encryption key can be an application key.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a server to perform steps of:
   receiving a request from a client with the request including an authentication token as a request header, wherein the authentication token includes a first encryption key, a second encryption key, and a timestamp;
   decrypting the authentication token with a private key of the server to obtain the first encryption key, the second encryption key, and the timestamp;
   validating the request based on the first encryption key and the timestamp, and, when valid, decrypting payload of the request with the second encryption key; and
   sending a failure code when the request is invalid, wherein the request is invalid when a current time is not within a predetermined time of the timestamp.

2. The non-transitory computer-readable storage medium of claim 1, wherein the computer-readable code is further configured to program the server to perform steps of
   checking a payload hash to the payload to determine if there has been a modification of the payload, and, if so, sending a failure code that the request is invalid.

3. The non-transitory computer-readable storage medium of claim 1, wherein the request header includes the first encryption key, the second encryption key, and the timestamp, each separated by an identifier.

4. The non-transitory computer-readable storage medium of claim 1, wherein the authentication token is encrypted with Public Key Infrastructure (PKI) with the client having a public key of the server.

5. The non-transitory computer-readable storage medium of claim 1, wherein the second encryption key is an Advanced Encryption Standard (AES) key.

6. The non-transitory computer-readable storage medium of claim 1, wherein the first encryption key is an application key.

7. A server comprising:
   a network interface communicatively coupled to a network;

a processor communicatively coupled to the network interface; and memory storing computer-executable instructions that, when executed, cause the processor to receive a request from a client with the request including an authentication token as a request header, wherein the authentication token includes a first encryption key, a second encryption key, and a timestamp;

decrypt the authentication token with a private key of the server to obtain the first encryption key, the second encryption key, and the timestamp;

validate the request based on the first encryption key and the timestamp, and, when valid, decrypt payload of the request with the second encryption key; and send a failure code when the request is invalid, wherein the request is invalid when a current time is not within a predetermined time of the timestamp.

8. The server of claim 7, wherein the computer-executable instructions that, when executed, further cause the processor to check a payload hash to the payload to determine if there has been a modification of the payload, and, if so, sending a failure code that the request is invalid.

9. The server of claim 7, wherein the request header includes the first encryption key, the second encryption key, and the timestamp, each separated by an identifier.

10. The server of claim 7, wherein the authentication token is encrypted with Public Key Infrastructure (PKI) with the client having a public key of the server.

11. The server of claim 7, wherein the second encryption key is an Advanced Encryption Standard (AES) key.

12. The server of claim 7, wherein the first encryption key is an application key.

13. A method implemented by a server, the method comprising:

receiving a request from a client with the request including an authentication token as a request header, wherein the authentication token includes a first encryption key, a second encryption key, and a timestamp;

decrypting the authentication token with a private key of the server to obtain the first encryption key, the second encryption key, and the timestamp;

validating the request based on the first encryption key and the timestamp, and, when valid, decrypting payload of the request with the second encryption key; and sending a failure code if the request is invalid, wherein the request is invalid if a current time is not within a predetermined time of the timestamp.

14. The method of claim 13, further comprising checking a payload hash to the payload to determine if there has been a modification of the payload, and, if so, sending a failure code that the request is invalid.

15. The method of claim 13, wherein the authentication token is encrypted with Public Key Infrastructure (PKI) with the client having a public key of the server.

* * * * *